(12) United States Patent
Dai et al.

(10) Patent No.: US 11,200,492 B1
(45) Date of Patent: *Dec. 14, 2021

(54) TRAINING A DOCUMENT CLASSIFICATION NEURAL NETWORK

(71) Applicant: Google LLC, Mountain View, CA (US)

(72) Inventors: Andrew M. Dai, San Francisco, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/735,453

(22) Filed: Jan. 6, 2020

Related U.S. Application Data

(63) Continuation of application No. 15/257,539, filed on Sep. 6, 2016, now Pat. No. 10,528,866.

(60) Provisional application No. 62/214,790, filed on Sep. 4, 2015.

(51) Int. Cl.
*G06N 3/04* (2006.01)
*G06N 3/08* (2006.01)

(52) U.S. Cl.
CPC .............. *G06N 3/08* (2013.01); *G06N 3/0445* (2013.01)

(58) Field of Classification Search
CPC .............................. G06N 3/0445; G06N 3/084
See application file for complete search history.

(56) References Cited

U.S. PATENT DOCUMENTS 9,728,185 B2    8/2017 Schalkwyk
2016/0342895 A1  11/2016 Gao

OTHER PUBLICATIONS

Deng, Jun, et al. "Introducing shared-hidden-layer autoencoders for transfer learning and their application in acoustic emotion recognition." 2014 IEEE international conference on acoustics, speech and signal processing (ICASSP). IEEE, 2014. (Year: 2014).*

(Continued)

*Primary Examiner* — Hal Schnee
(74) *Attorney, Agent, or Firm* — Fish & Richardson P.C.

(57) ABSTRACT

Methods, systems, and apparatus, including computer programs encoded on computer storage media, for training a document classification neural network. One of the methods includes training an autoencoder neural network to autoencode input documents, wherein the autoencoder neural network comprises the one or more LSTM neural network layers and an autoencoder output layer, and wherein training the autoencoder neural network comprises determining pretrained values of the parameters of the one or more LSTM neural network layers from initial values of the parameters of the one or more LSTM neural network layers; and training the document classification neural network on a plurality of training documents to determine trained values of the parameters of the one or more LSTM neural network layers from the pre-trained values of the parameters of the one or more LSTM neural network layers.

35 Claims, 4 Drawing Sheets

(56) References Cited

OTHER PUBLICATIONS

Zhang, Xi, et al. "Learning classifiers from synthetic data using a multichannel autoencoder." arXiv preprint arXiv:1503.03163 (2015). (Year: 2015).*

"PTE: Predictive Text Embedding through Large-scale Heterogeneous Text Networks," Jian Tang, Meng Qu, and Qiaozhu Mei; KDD'15, Aug. 10-13, 2015, Sydney, NSW, Australia. © 2015 ACM. ISBN 978-1-4503-3664-2/15/08. DOI: http://dx.doi.org/10.1145/2783258.2783307 (Year: 2015).

Graves, "Supervised Sequence Labelling with Recurrent Neural Networks," vol. 385 of Studies in Computational Intelligence, Springer 2012 [online] (retrieved from https://www.cs.toronto.edu/~graves/preprint.pdf), 137 pages.

* cited by examiner

TRAINING A DOCUMENT CLASSIFICATION NEURAL NETWORK

CROSS-REFERENCE TO RELATED APPLICATIONS

This is a continuation of U.S. application Ser. No. 15/257,539, filed on Sep. 6, 2016, which claims priority to U.S. Provisional Application No. 62/214,790, filed on Sep. 4, 2015. The disclosures of the prior applications are considered part of and are incorporated by reference in the disclosure of this application.

BACKGROUND

This specification relates to training neural networks.

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In general, one innovative aspect of the subject matter described in this specification can be embodied in methods for training a document classification neural network that includes one or more long short-term memory (LSTM) neural network layers, a document classification output layer, and, optionally, an embedding input layer. In particular, a system pre-trains a different neural network that includes the one or more LSTM neural network layers on unlabeled training data to determine pre-trained values of the parameters of the one or more LSTM neural network layers and then trains the document classification neural network on labeled training data to determine trained values of the parameters of the one or more LSTM neural network layers from the pre-trained values of the parameters of the one or more LSTM neural network layers. Once trained, the document classification neural network can be used to classify input documents in accordance with the trained values of the parameters of the LSTM neural network layers.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. By pre-training the LSTM layers of a document classification neural network on either a sequence autoencoding task or a language modeling task, the performance of the trained document classification neural network can be improved. In particular, the pre-training techniques described in this specification can result in a trained document classification neural network that is more stable and has improved generalization. Additionally, the training time and, therefore, the computational resources, required to train the document classification neural network can be reduced. Because training on the sequence autoencoding task or the language modeling task does not require labeled training data, the availability of a large amount of unsupervised training data can be leveraged to improve the performance of the document classification neural network even though training the document classification neural network to classify input documents requires labeled data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
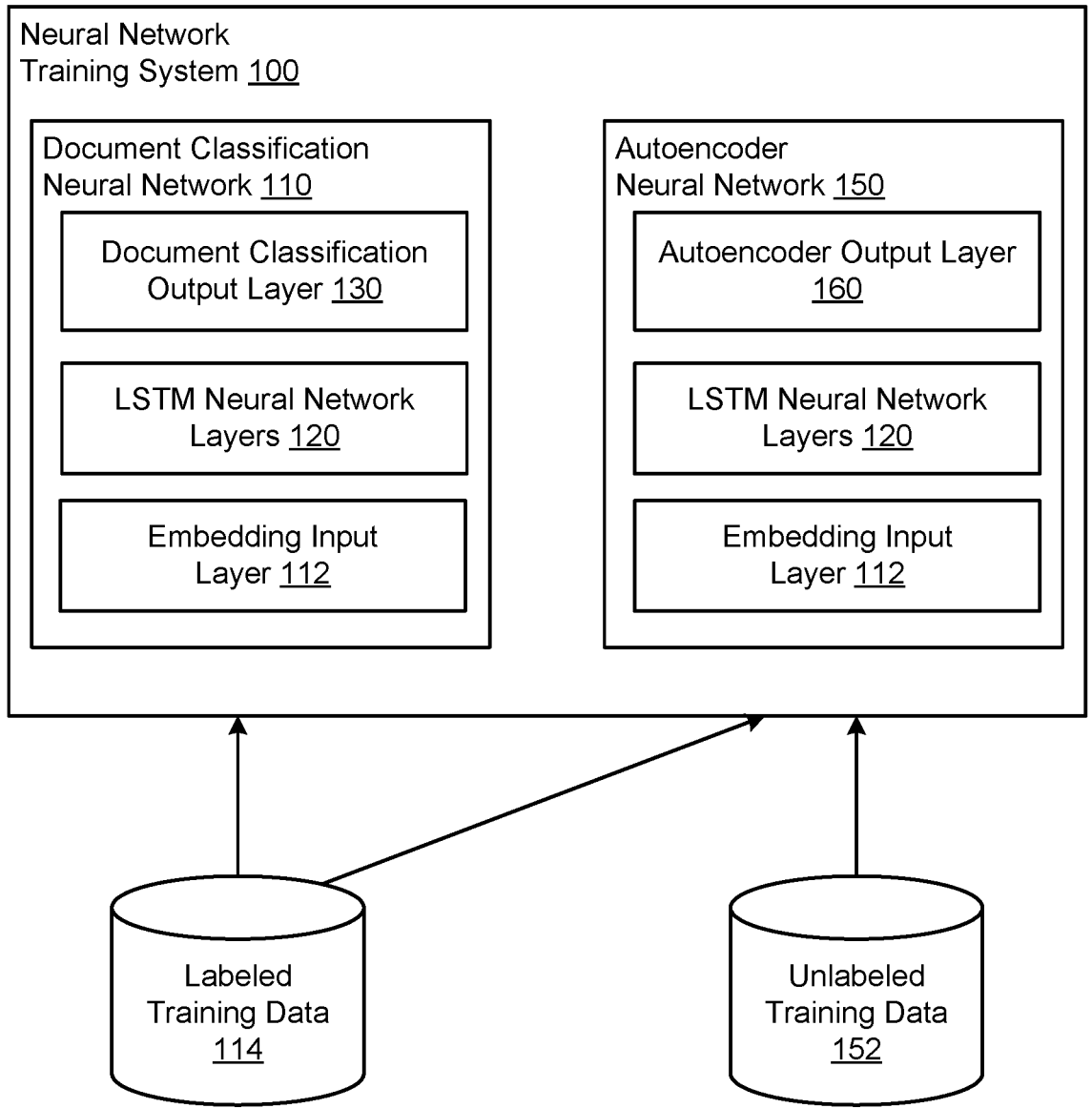
FIG. 1 shows an example neural network training system.

FIG. 1 shows an example neural network training system 100.

The neural network training system 100 is an example of a system implemented as computer programs on one or more computers in one or more locations, in which the systems, components, and techniques described below can be implemented.

The neural network training system 100 trains a document classification neural network 110 to determine trained values of the parameters of the document classification neural network 110 from initial values of the parameters.

The document classification neural network 110 is a neural network that receives a sequence of text from an input document that includes multiple words ordered in the order in which the words appear in the input document and generates a classification output for the document. The text sequence can be, e.g., a sentence, multiple sentences, or the entire text of the input document.

The document classification neural network 110 can be configured to generate any of a variety of classification outputs that classify the input document.

For example, the classification output can be a set of label scores that includes a respective label score for each label in a predetermined set of labels, with the label score for a given label representing a likelihood that the label is an accurate label for the input document, i.e., that the label accurately describes the content of the input document in various ways.

As another example, the classification output can be a sentiment score that measures the degree to which the sentiment of the input document is positive or negative. For example, a higher sentiment score can represent a more positive sentiment while a lower sentiment score represents a more negative sentiment.

The document classification neural network 110 includes an embedding input layer 112, one or more long short-term memory (LSTM) neural network layers 120, and a document classification output layer 130.

For each word in an input text sequence, the embedding input layer 102 is configured to map the word to a numeric embedding, i.e., a numeric representation of the word.

The LSTM layers 120 are configured to receive the numeric representation of the word and to process the numeric representation in accordance with current values of the parameters of the LSTM layers 120 and a current hidden state of the LSTM layers 120 to generate an LSTM output and to update the current hidden state.

In particular, each LSTM layer 120 includes one or more LSTM memory blocks, with each LSTM memory block including one or more cells that each include an input gate, a forget gate, and an output gate that allow the cell to store previous states for the cell, e.g., for use in generating a current activation. An example configuration of the one or more LSTM layers 120 is described in Alex Graves, *Supervised Sequence Labelling with Recurrent Neural Networks*, volume 385 of Studies in Computational Intelligence, Springer, 2012.

The document classification output layer 130 is configured to receive as input an LSTM output and to generate an output by processing the LSTM output.

In some implementations, the document classification output layer 130 is configured to process the LSTM output for the last word in the sequence to generate the classification output for the text sequence.

In some other implementations, the document classification output layer 130 is configured to process the LSTM output for each word in the sequence to generate a respective initial classification output for each word. In these implementations, the document classification neural network 110 is configured to generate the final classification output for the sequence by combining the initial classification outputs for the words in the sequence, e.g., by determining a measure of central tendency of the initial classification outputs.

As described above, the classification output that the document classification output layer 130 is configured to generate can be any of a variety of document classification outputs that classify the input document.

To improve the training of the document classification neural network 110, the neural network training system 100 also maintains an autoencoder neural network 150 that includes the embedding input layer 112, the LSTM neural network layers 120, and an autoencoder output layer 160.

The autoencoder neural network 150 is configured to autoencode input text sequences. That is, the autoencoder neural network 150 is configured to process the input text sequence and, after having the processed the input text sequence, generate a reconstruction of the input text sequence.

In particular, for a given input text sequence, the autoencoder neural network 150 is configured to, as described above with reference to the document classification neural network 110, process each word in the input text sequence in order through the embedding input layer 112 and the LSTM neural network layers 120 to generate an updated hidden state of the LSTM neural network layers 120 after the last word in the sequence has been processed.

The autoencoder neural network 150 is then configured to, for each word in the sequence, process the word preceding the word in the sequence using the embedding input layer 112 to map the preceding word to a numeric embedding of the word and process the numeric embedding for the preceding word through the LSTM layers 120 to update the current hidden state of the LSTM layers 120 and generate an LSTM output. For the first word in the sequence, the preceding word can be a predetermined end-of-sentence token.

For each word, the autoencoder output layer 160 is configured to process the LSTM output for the preceding word to generate a set of word scores that includes a respective score for each of multiple vocabulary words. The word score for a given vocabulary word represents a likelihood that the vocabulary word is the current word in the sequence, i.e., that the vocabulary word is the word that immediately follows the preceding word in the sequence.

To train the document classification neural network 110, the neural network training system 100 first trains the autoencoder neural network 150 to determine pre-trained values of the parameters of the LSTM neural network layers 120 from initial values, e.g., from randomly initialized or predetermined initial values, of the parameters. In some implementations, the parameters of the embedding input layer 112 are fixed during the training of the autoencoder neural network 150. In some other implementations, the neural network training system 110 also determines pre-trained values of the parameters of the embedding input layer 112 during the training of the autoencoder neural network 150. Training the autoencoder neural network 150 is described in more detail below with reference to FIG. 2.

Once the autoencoder neural network 150 has been trained, the neural network training system 100 trains the document classification neural network 110 to determine trained values of the parameters of the LSTM neural network layers 120 from the pre-trained values and, optionally, to determine trained values of the parameters of the embedding input layer 112 from the pre-trained values. Training the document classification neural network 110 is described in more detail below with reference to FIG. 2.

In particular, the neural network training system 100 trains the autoencoder neural network 150 on unlabeled training data 152 and labeled training data 114 and then trains the document classification neural network 110 only on labeled training data 114. The unlabeled training data 152 includes text sequences from unlabeled training documents. The labeled training data 114, on the other hand, includes text sequences from labeled training documents, i.e., documents that have been associated with a known output that should be generated by the document classification neural network 110 by processing sequences from the documents. Accordingly, because the labeled documents need to be labeled in order to be used for training, more unlabeled training data 152 may be available to the neural network training system 100 than labeled training data 114.

Figure 2:
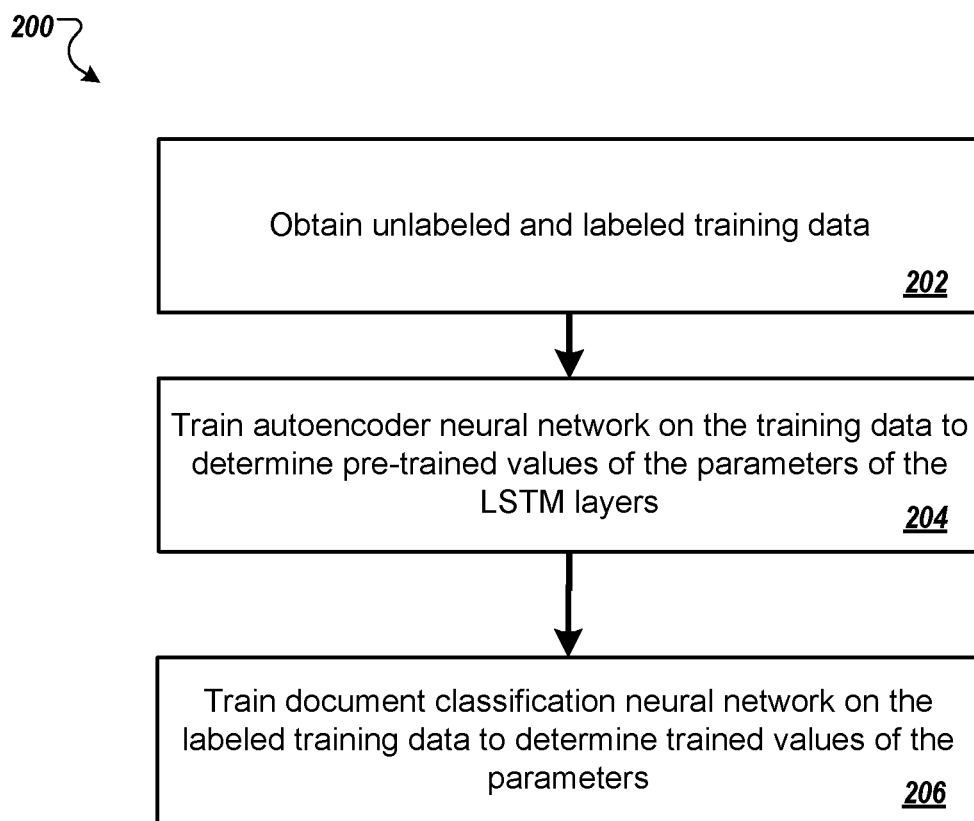
FIG. 2 is a flow diagram of an example process for training a document classification neural network.

FIG. 2 is a flow diagram of an example process 200 for training a document classification neural network. For convenience, the process 200 will be described as being performed by a system of one or more computers located in one or more locations. For example, a neural network training system, e.g., the neural network training system 100 of FIG. 1, appropriately programmed, can perform the process 200.

The system obtains unlabeled and labeled training data (step 202).

The unlabeled training data is training data that includes multiple training text sequences from unlabeled training documents.

The labeled training data is training data that includes multiple training text sequences and, for each training text sequence, a respective label that identifies a known classification output for the training text sequence, i.e., that identifies the output that should be generated by the document classification neural network for the training text sequence.

The system trains the autoencoder neural network on the training data to determine pre-trained values of the parameters of the LSTM layers (step 204).

When both unlabeled training data and labeled training data is available, the system trains the autoencoder neural network on both the unlabeled and labeled training data, i.e., by disregarding the labels for the labeled training data to treat the data as unlabeled training data.

When only labeled training data is available, the system trains the autoencoder neural network on the labeled training data, i.e., by disregarding the labels for the labeled training data to treat the data as unlabeled training data.

In particular, for each text sequence in the training data, the system processes the sequence using the autoencoder neural network in accordance with current values of the parameters of the LSTM layers to determine a set of word scores for each word in the sequence. The set of word scores for a given word at a given position in the sequence includes a respective score for each of multiple vocabulary words, with the word score for a given vocabulary word representing a likelihood that the vocabulary word would be the word at the given position.

For each word in the sequence, the system determines an error between the likelihoods represented by the set of word scores for the word and a known set of word scores that identifies the word scores that should have been generated by the autoencoder neural network for the word. In particular, the known set of word scores for a given word at a given position indicate that the given word is at the given position in the sequence. For example, the error can be a cross-entropy loss, a mean-squared loss, or a different machine learning error measure that is appropriate for the training technique.

The system then updates the current values of the parameters of the LSTM layers based on the error using a backpropagation-through-time training technique.

By processing each of the word sequences in the unlabeled training data in this manner, the system iteratively adjusts the initial values of the parameters of the LSTM layers to determine the pre-trained values of the parameters of the LSTM layers.

The system trains the document classification neural network on the labeled training data to determine trained values of the parameters of the document classification neural network, including trained values of the parameters of the LSTM layers (step 206).

In particular, the system initializes, for the training of the document classification neural network, the values of the parameters of the one or more LSTM layers to be the pre-trained values of the parameters and then trains the document classification neural network using a conventional supervised learning training technique to determine trained values of the parameters of the LSTM layers.

Figure 3:
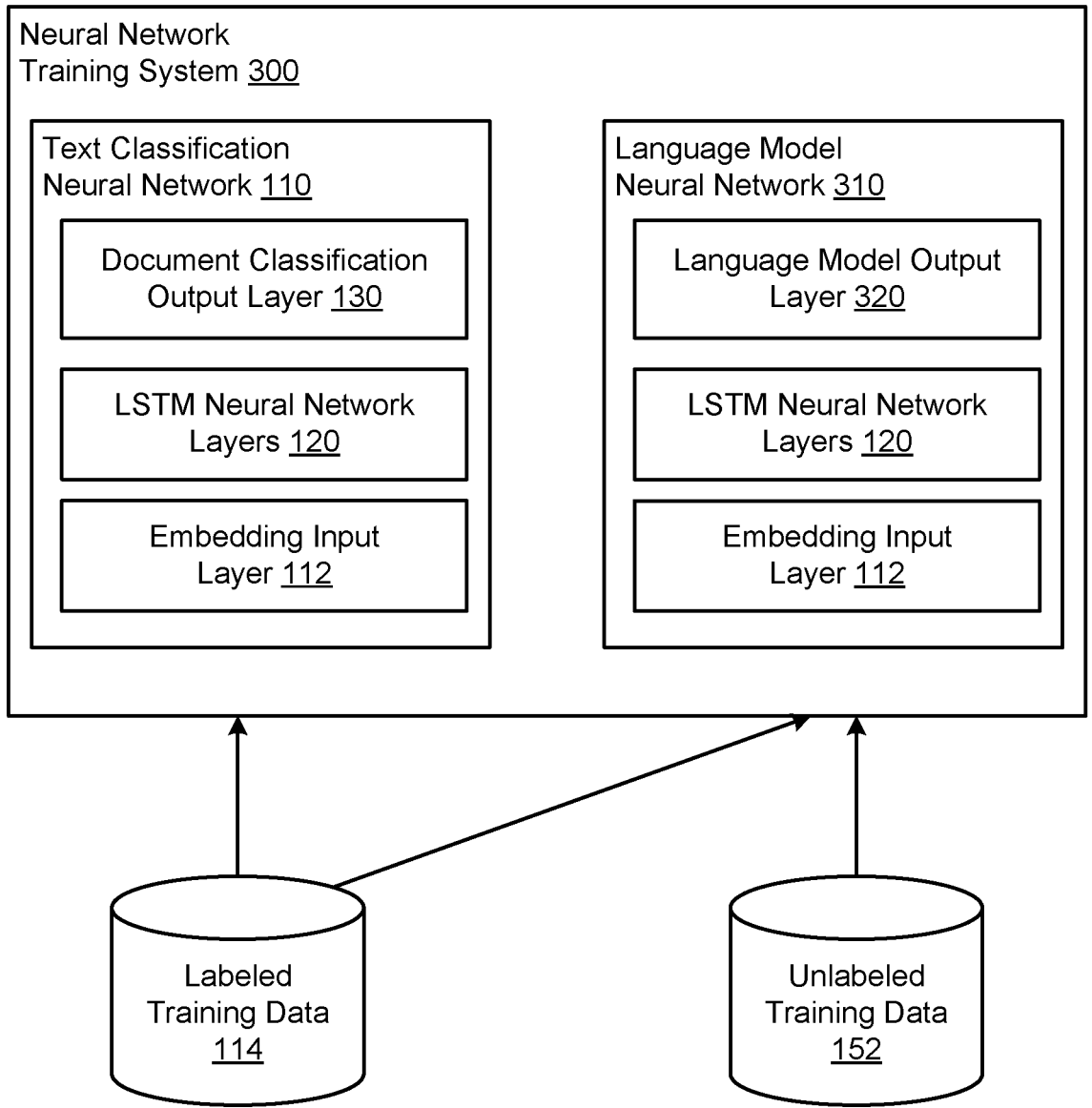
FIG. 3 shows another example neural network training system.

FIG. 3 shows another example neural network training system 300. The neural network training system 300 is an example of a system implemented as computer programs on one or more computers in one or more locations, in which the systems, components, and techniques described below can be implemented.

Like the neural network training system 100, the neural network training system 300 trains the document classification neural network 110 to determine trained values of the parameters of the document classification neural network 110 from initial values of the parameters.

To improve the training of the document classification neural network 110, the neural network training system 300 also maintains a language model neural network 310 that includes the embedding input layer 112, the LSTM neural network layers 120 and a language model output layer 320.

The language model neural network 310 is configured to receive as input a word sequence from an input document and predict a word that is missing from the word sequence. That is, the language model neural network 310 is configured to predict a word that appears in a predetermined position in the input document relative to the words in the sequence, i.e., after the last word in the word sequence in the input document or between two words at predetermined positions in the word sequence in the input document.

In particular, for a given input text sequence, the language model neural network 310 is configured to process each word in the input text sequence in order through the embedding input layer 112 and the LSTM neural network layers 120 to generate an updated hidden state of the LSTM neural network layers 120 and to generate an LSTM output for the last word in the text sequence.

The language model output layer 320 is configured to process the LSTM output for the last word in the sequence to generate a set of word scores for the word sequence that includes a respective score for each of multiple vocabulary words. The word score for a given vocabulary word represents a likelihood that the vocabulary word is the missing word in the text sequence.

To train the document classification neural network 110, the neural network training system 100 first trains the language model neural network 310 to determine pre-trained values of the parameters of the LSTM neural network layers 120 from initial values, e.g., from randomly initialized or predetermined initial values, of the parameters. In some implementations, the parameters of the embedding input layer 112 are fixed during the training of the language model neural network 310. In some other implementations, the neural network training system 110 also determines pre-trained values of the parameters of the embedding input layer 112 during the training of the language model neural network 310. Training the language model neural network 310 is described in more detail below with reference to FIG. 4.

Once the language model neural network 310 has been trained, the neural network training system 100 trains the document classification neural network 110 to determine trained values of the parameters of the LSTM neural network layers 120 from the pre-trained values and, optionally, to determine trained values of the parameters of the embedding input layer 112 from the pre-trained values, e.g., as described above with reference to FIGS. 1 and 2.

In particular, the neural network training system 100 trains the language model neural network 310 on the unlabeled training data 152 and the labeled training data 114 and then trains the document classification neural network 110 only on the labeled training data 114.

Figure 4:
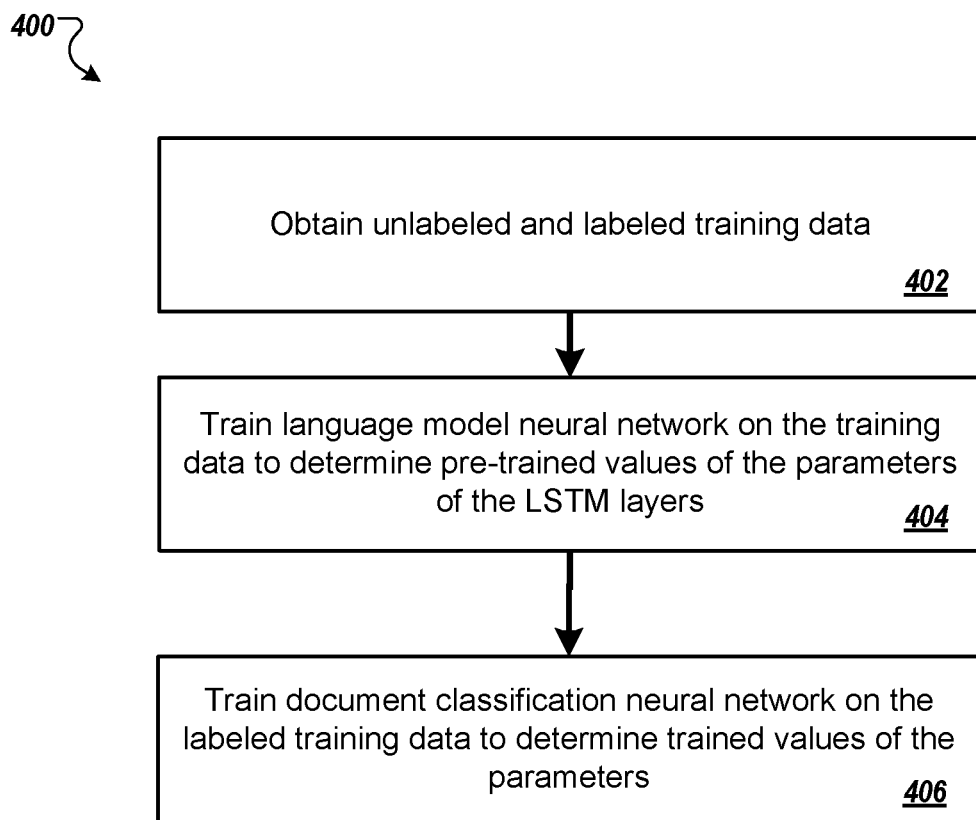
FIG. 4 is a flow diagram of another example process for training a document classification neural network.

FIG. 4 is a flow diagram of another example process 400 for training a document classification neural network. For convenience, the process 400 will be described as being performed by a system of one or more computers located in one or more locations. For example, a neural network training system, e.g., the neural network training system 300 of FIG. 1, appropriately programmed, can perform the process 400.

The system obtains unlabeled and labeled training data (step 402).

The unlabeled training data includes word sequences from unlabeled training documents and, for each word sequence, a held-out word that appears in a predetermined position in the training document relative to the words in the word sequence. For example, the held-out word for a given sequence can be the word that follows the last word in the word sequence in the input document or the word that appears in the input document between two of the words at predetermined positions in the sequence.

The labeled training data is training data that includes multiple training text sequences and, for each training text sequence, a respective label that identifies a known classification output for the training text sequence, i.e., that identifies the output that should be generated by the document classification neural network for the training text sequence.

The system trains the language model neural network on the training data to determine pre-trained values of the parameters of the LSTM layers from initial values of the parameters (step 404).

When both unlabeled training data and labeled training data is available, the system trains the language model neural network on both the unlabeled and labeled training data, i.e., by disregarding the labels for the labeled training data and modifying the training sequences in the labeled training data to remove a word from each sequence that serves as the held-out word for the training sequence.

When only labeled training data is available, the system trains the language model neural network on the labeled training data, i.e., by disregarding the labels for the labeled training data and modifying the training sequences in the labeled training sequence to remove a word that serves as the held-out word for the training sequence.

To train the language model neural network, the system processes each word sequence using the language model neural network in accordance with current values of the parameters of the LSTM layers to generate a set of word scores for the word sequence that includes a respective score for each of multiple vocabulary words. The word score for a given vocabulary word represents a likelihood that the vocabulary word is the word that appears in the predetermined position in an input document relative to the words in the word sequence.

The system then determines an error between the likelihoods represented by the set of word scores and a known set of word scores for the sequence that indicates that the held-out word is the word that appears in the predetermined position in the input document relative to the words in the word sequence and updates the current values of the parameters of the LSTM neural network layers based on the error using a backpropagation-through-time training technique. For example, the error can be a cross-entropy loss, a mean-squared loss, or a different machine learning error measure that is appropriate for the training technique.

By processing each of the word sequences in the training data in this manner, the system iteratively adjusts the initial values of the parameters of the LSTM layers to determine the pre-trained values of the parameters of the LSTM layers.

The system trains the document classification neural network on the labeled training data to determine trained values of the parameters of neural network, including trained values of the parameters of the LSTM layers (step 406), as described above with reference to step 206 of FIG. 2.

The description of the processes 200 and 400 describes how values of the LSTM layers are pre-trained values and how those values are then adjusted to determine trained values of the parameters. In some implementations, the parameters of the embedding input layer are also first pre-trained and then trained in the same manner as described above for the LSTM layers with reference to the processes 200 and 400.

Additionally, in some implementations, once the document classification neural network has been trained using either the process 200 or the process 400, the document classification neural network can be used to classify input documents in accordance with the trained values of the parameters of the one or more LSTM layers.

In particular, to classify a document using the document classification neural network, the system receives a word sequence from the document and, for each input word in the sequence in order, processes the word preceding the input word in the sequence using the embedding input layer to map the word to a numeric embedding of the word, processes the numeric embedding through the one or more LSTM layers to update the current internal state of the LSTM neural network layers and generate an LSTM output for the input word in accordance with the trained values of the parameters of the LSTM layers, and processes the LSTM output using the document classification output layer to generate one or more classification scores for the input word. The system can then classify the input document from the classification scores for the last word in the sequence or from a combination of the classification scores for the input words in the sequence.

The system can then provide a classification of the document or data identifying the classification score or scores for the document for presentation to a user on a user computer, sort the classification or the data identifying the classification score or scores in association with data identifying the document, or provide the classification or the data identifying the classification score or scores to another system for use for some immediate purpose.

Additionally, in some implementations, once the document classification neural network has been trained using either the process 200 or the process 400, the system stores the trained values of the parameters of the network or provides the trained values of the parameters to another system for use in instantiating a trained neural network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a first neural network to perform a document processing task, wherein the first neural network comprises one or more initial neural network layers and a first output layer, wherein the one or more initial neural network layers have parameters, and wherein the method comprises:
    training an autoencoder neural network to autoencode input documents, wherein the autoencoder neural network comprises the one or more initial neural network layers and an autoencoder output layer, and wherein training the autoencoder neural network comprises determining pre-trained values of the parameters of the one or more initial neural network layers from initial values of the parameters of the one or more initial neural network layers; and
    training the first neural network on a plurality of training documents to determine trained values of the parameters of the one or more initial neural network layers from the pre-trained values of the parameters of the one or more initial neural network layers.

2. The method of claim 1, wherein training the first neural network on a plurality of training documents to determine trained values of the parameters of the one or more initial neural network layers from the pre-trained values of the parameters of the one or more initial neural network layers comprises:
    initializing, for the training of the first neural network, the values of the parameters of the one or more initial neural network layers to be the pre-trained values of the parameters of the one or more initial neural network layers.

3. The method of claim 1, wherein the autoencoder neural network further comprises:
    an embedding input layer configured to, for each word in an input sequence of words, receive the word and map the word to a numeric embedding of the word.

4. The method of claim 3, wherein training the autoencoder neural network to autoencode input documents comprises, for a particular input document:
    obtaining a sequence of input words that comprises words from the particular input document arranged in the order in which the words appear in the particular input document;
    for each particular input word in the sequence:
        processing the word preceding the particular input word in the sequence using the embedding input layer to map the word preceding the particular input word in the sequence to a numeric embedding; and
        processing the numeric embedding through the one or more initial neural network layers generate an initial output in accordance with current values of the parameters of the initial neural network layers; and
        processing the initial output using the autoencoder output layer to generate a set of word scores for the particular input word, wherein the set of word scores comprises a respective score for each of a plurality of vocabulary words that represents a likelihood that the vocabulary word is the particular input word.

5. The method of claim 4, wherein training the autoencoder neural network to autoencode input documents further comprises, for the particular input document:
    adjusting the current values of the parameters of the initial neural network layers using the set of word scores for each of the particular input words in the sequence.

6. The method of claim 5, wherein adjusting the current values of the parameters of the initial neural network layers comprises, for each particular input word in the sequence:
    determining an error between the likelihoods represented by the set of word scores for the particular input word and a known set of word scores for the particular input word that identifies the particular input word; and
    updating values of the parameters of the initial neural network layers based on the error using a backpropagation-through-time training technique.

7. The method of claim 4, wherein, for a first input word in the sequence, the preceding word is a predetermined end-of-sentence token.

8. The method of claim 1, wherein training the autoencoder neural network comprises training the autoencoder neural network on unlabeled training documents and labeled training documents, and wherein training the first neural network comprises training the first neural network on the labeled training documents and not on the unlabeled training documents.

9. The method of claim 1, wherein the first neural network further comprises an embedding input layer configured to, for each word in an input sequence of words, receive the word and map the word to a numeric embedding of the word.

10. The method of claim 9, further comprising classifying an input document using the first neural network in accordance with the trained values of the parameters of the one or more initial neural network layers, comprising, for each input word in a sequence of words from the input document:
    processing the word preceding the input word in the sequence using the embedding input layer to map the word preceding the input word in the sequence to a numeric embedding;

processing the numeric embedding through the one or more initial neural network layers to generate an initial output in accordance with the trained values of the parameters of the initial neural network layers; and processing the initial output using the first output layer to generate one or more classification scores for the input word.

11. The method of claim 10, wherein classifying the input document further comprises:
classifying the input document from the classification scores for a last input word in the sequence.

12. The method of claim 10, wherein classifying the input document further comprises:
classifying the input document from a combination of the classification scores for the input words in the sequence.

13. The method of claim 10, wherein the classification scores comprise a respective score for each label in a predetermined set of labels that represents a likelihood that the label is an accurate label for the input document.

14. The method of claim 10, wherein the classification scores comprise a sentiment score that measures a degree to which the sentiment of the input document is positive or negative.

15. A method for training a first neural network to perform a document processing task, wherein the first neural network comprises one or more initial neural network layers and a first output layer, wherein the one or more initial neural network layers have parameters, and wherein the method comprises:
training a language model neural network to predict missing words in word sequences, wherein the language model neural network comprises the one or more initial neural network layers and a language model output layer, and wherein training the language model neural network comprises determining pre-trained values of the parameters of the one or more initial neural network layers from initial values of the parameters of the one or more initial neural network layers; and
training the first neural network on a plurality of training documents to determine trained values of the parameters of the one or more initial neural network layers from the pre-trained values of the parameters of the one or more initial neural network layers.

16. The method of claim 15, wherein training the first neural network on a plurality of training documents to determine trained values of the parameters of the one or more initial neural network layers from the pre-trained values of the parameters of the one or more initial neural network layers comprises:
initializing, for the training of the first neural network, the values of the parameters of the one or more initial neural network layers to be the pre-trained values of the parameters of the one or more initial neural network layers.

17. The method of claim 15, wherein the language model neural network further comprises:
an embedding input layer configured to, for each word in an input sequence of words, receive the word and map the word to a numeric embedding of the word.

18. The method of claim 17, wherein training the language model neural network comprises, for a particular input document:
obtaining a sequence of input words that comprises words from the particular input document arranged in the order in which the words appear in the particular input document;

obtaining a held-out word that appears in a corresponding position in the particular input document relative to the words in the sequence of input words;

generating an initial output by processing each input word in the sequence of input words using the language model neural network in accordance with current values of the parameters of the initial neural network layers; and processing the initial output using the language model output layer to generate a set of word scores, wherein the set of word scores comprises a respective score for each of a plurality of vocabulary words that represents a likelihood that the vocabulary word is the word that appears in the corresponding position in the particular input document relative to the words in the sequence of input words.

19. The method of claim 18, wherein training the language model neural network further comprises, for the particular input document:
adjusting the current values of the parameters of the initial neural network layers using the set of word scores.

20. The method of claim 19, wherein adjusting the current values of the parameters of the initial neural network layers comprises:
determining an error between the likelihoods represented by the set of word scores and a known set of word scores for the sequence that indicates that the held-out word is the word that appears in the corresponding position in the particular input document relative to the words in the sequence of input words; and
updating values of the parameters of the initial neural network layers based on the error using a backpropagation-through-time training technique.

21. The method of claim 15, wherein training the language model neural network comprises training the language model neural network on sequences from unlabeled training documents, and wherein training the first neural network comprises training the first neural network on labeled training documents.

22. A system comprising one or more computers and one or more storage devices storing instructions that when executed by the one or more computers cause the one or more computers to perform operations for training a first neural network to perform a document processing task, wherein the first neural network comprises one or more initial neural network layers and a first output layer, wherein the one or more initial neural network layers have parameters and wherein the operations comprise:
training an autoencoder neural network to autoencode input documents, wherein the autoencoder neural network comprises the one or more initial neural network layers and an autoencoder output layer, and wherein training the autoencoder neural network comprises determining pre-trained values of the parameters of the one or more initial neural network layers from initial values of the parameters of the one or more initial neural network layers; and training the first neural network on a plurality of training documents to determine trained values of the parameters of the one or more initial neural network layers from the pre-trained values of the parameters of the one or more initial neural network layers.

23. The system of claim 22, wherein training the first neural network on a plurality of training documents to determine trained values of the parameters of the one or more initial neural network layers from the pre-trained values of the parameters of the one or more initial neural network layers comprises:
   initializing, for the training of the first neural network, the values of the parameters of the one or more initial neural network layers to be the pre-trained values of the parameters of the one or more initial neural network layers.

24. The system of claim 22, wherein training the autoencoder neural network comprises training the autoencoder neural network on unlabeled training documents and labeled training documents, and wherein training the first neural network comprises training the first neural network on the labeled training documents and not on the unlabeled training documents.

25. The system of claim 22, the operations further comprising classifying an input document using the first neural network in accordance with the trained values of the parameters of the one or more initial neural network layers, comprising, for each input word in a sequence of words from the input document:
   processing the word preceding the input word in the sequence using an embedding input layer to map the word preceding the input word to the sequence to a numeric embedding;
   processing the numeric embedding through the one or more initial neural network layers to generate an initial output in accordance with the trained values of the parameters of the initial neural network layers; and
   processing the initial output using the first output layer to generate one or more classification scores for the input word.

26. One or more non-transitory computer-readable storage media storing instructions that when executed by one or more computers cause the one or more computers to perform operations for training a first neural network to perform a document processing task, wherein the first neural network comprises one or more long initial neural network layers and a first output layer, wherein the one or more initial neural network layers have parameters and wherein the operations comprise:
   training an autoencoder neural network to autoencode input documents, wherein the autoencoder neural network comprises the one or more initial neural network layers and an autoencoder output layer, and wherein training the autoencoder neural network comprises determining pre-trained values of the parameters of the one or more initial neural network layers from initial values of the parameters of the one or more initial neural network layers; and
   training the first neural network on a plurality of training documents to determine trained values of the parameters of the one or more initial neural network layers from the pre-trained values of the parameters of the one or more initial neural network layers.

27. The computer-readable storage media of claim 26, wherein
   training the first neural network on a plurality of training documents to determine trained values of the parameters of the one or more initial neural network layers from the pre-trained values of the parameters of the one or more initial neural network layers comprises:
   initializing, for the training of the first neural network, the values of the parameters of the one or more initial neural network layers to be the pre-trained values of the parameters of the one or more initial neural network layers.

28. The computer-readable storage media of claim 26, wherein training the autoencoder neural network comprises training the autoencoder neural network on unlabeled training documents and labeled training documents, and wherein training the first neural network comprises training the first neural network on the labeled training documents and not on the unlabeled training documents.

29. The computer-readable storage media of claim 26, the operations further comprising classifying an input document using the first neural network in accordance with the trained values of the parameters of the one or more initial neural network layers, comprising, for each input word in a sequence of words from the input document:
   processing the word preceding the input word in the sequence using an embedding input layer to map the word preceding the input word in the sequence to a numeric embedding;
   processing the numeric embedding through the one or more initial neural network layers to generate an initial output in accordance with the trained values of the parameters of the initial neural network layers; and
   processing the initial output using the first output layer to generate one or more classification scores for the input word.

30. A system comprising one or more computers and one or more storage devices storing instructions that when executed by the one or more computers cause the one or more computers to perform operations for training a first neural network to perform a document processing task, wherein the first neural network comprises one or more initial neural network layers and a first output layer, wherein the one or more initial neural network layers have parameters and wherein the operations comprise:
   training a language model neural network to predict missing words in word sequences, wherein the language model neural network comprises the one or more initial neural network layers and a language model output layer, and wherein training the language model neural network comprises determining pre-trained values of the parameters of the one or more initial neural network layers from initial values of the parameters of the one or more initial neural network layers; and
   training the first neural network on a plurality of training documents to determine trained values of the parameters of the one or more initial neural network layers from the pre-trained values of the parameters of the one or more initial neural network layers.

31. The system of claim 30, wherein training the first neural network on a plurality of training documents to determine trained values of the parameters of the one or more initial neural network layers from the pre-trained values of the parameters of the one or more initial neural network layers comprises:
   initializing, for the training of the first neural network, the values of the parameters of the one or more initial neural network layers to be the pre-trained values of the parameters of the one or more initial neural network layers.

32. The system of claim 30, wherein training the language model neural network comprises training the language model neural network on sequences from unlabeled training documents, and wherein training the first neural network comprises training the first neural network on labeled training documents.

33. One or more non-transitory computer-readable storage media storing instructions that when executed by one or more computers cause the one or more computers to perform operations for training a first neural network to perform a document processing task, wherein the first neural network comprises one or more initial neural network layers and a first output layer, wherein the one or more initial neural network layers have parameters and wherein the operations comprise:

training a language model neural network to predict missing words in word sequences, wherein the language model neural network comprises the one or more initial neural network layers and a language model output layer, and wherein training the language model neural network comprises determining pre-trained values of the parameters of the one or more initial neural network layers from initial values of the parameters of the one or more initial neural network layers; and training the first neural network on a plurality of training documents to determine trained values of the parameters of the one or more initial neural network layers from the pre-trained values of the parameters of the one or more initial neural network layers.

34. The computer-readable storage media of claim 33, wherein training the first neural network on a plurality of training documents to determine trained values of the parameters of the one or more initial neural network layers from the pre-trained values of the parameters of the one or more initial neural network layers comprises:

initializing, for the training of the first neural network, the values of the parameters of the one or more initial neural network layers to be the pre-trained values of the parameters of the one or more initial neural network layers.

35. The computer-readable storage media of claim 33, wherein training the language model neural network comprises training the language model neural network on sequences from unlabeled training documents, and wherein training the first neural network comprises training the first neural network on labeled training documents.

* * * * *